3,240,794
BROMINATING HIGHER FATTY
ACIDS AND ESTERS
Marcus Bornfleth, Lansing, Ill., assignor to Swift & Company, Chicago, Ill., a corporation of Illinois
No Drawing. Filed May 7, 1962, Ser. No. 192,989
7 Claims. (Cl. 260—408)

This invention relates to the halogenation of unsaturated organic compounds and, more specifically, to improved methods for brominating ethylenically unsaturated organic materials.

One of the best known methods for brominating unsaturated organic materials involves contacting the unsaturated material with bromine at low temperatures. Improvements on this well known procedure have been suggested and among these improvements are the use of water as a carrier for the bromine in the reaction, the use of methanol to facilitate the addition of bromine to the unsaturated material and permit the production of pure brominated products, and also the use of sulfur dioxide to insure intimate contact of the bromine with the material undergoing bromination.

While each of these procedures has provided an improvement in the process, such as more complete bromination, more rapid bromination or freedom from undesirable side reactions, each has been found to have attendant shortcomings. Thus, if it is desired to produce a brominated product having the maximum amount of bromine addition and a minimum amount of color, as well as freedom from objectionable odors, none of the prior art procedures can be considered satisfactory. Further, operating difficulties arise, if, as is suggested in the art, water is used as the sole diluent in the bromination reaction. The use of water alone as a diluent or carrier in the bromination reaction results in the production of viscous, pasty emulsions which cannot readily be broken.

It is, accordingly, an object of this invention to provide an improved method for halogenating unsaturated organic compounds whereby to produce more completely halogenated products substantially free of color.

Another object of the invention is the provision of a method for brominating ethylenically unsaturated organic compositions in a more facile manner while retarding the development of color in the brominated product.

Additional objects, if not specifically set forth herein, will be readily apparent to those skilled in the art from the detailed description of the invention which follows.

Generally, the present invention comprises an improved method for halogenating halogenatable materials in the presence of inert liquid diluents which facilitate the addition of halogen to the sites of unsaturation in the organic compound and, also, exert sufficient control on the halogenation reaction to insure that the production of objectionable color in the product will be retarded. It is, thus, possible to produce more highly halogenated products having a light color. These characteristics are important in the production of brominated fatty acids and derivatives thereof which are manufactured for use as weighting agents in soft drinks and, also, as components of flameproof adhesives.

More specifically, the method of the invention comprises the bromination of organic hydrocarbons and derivatives thereof with the bromination being carried out in the presence of a mixture of water and a solvent for the material undergoing bromination. The bromination reaction involves the steps of combining bromine with the unsaturated material being brominated in the presence of the mixture to initiate an exothermic reaction and, also, controlling the temperature of the reaction to insure efficient addition of bromine to the unsaturated compound while avoiding darkening of the product. The amount of bromine employed is a stoichiometric amount or an excess of about 5–10% over the stoichiometric amount based upon the amount of unsaturation in the material being brominated. The reaction temperature is held below about 25–30° C. by cooling as required. The reaction is carried out by agitating the mixture of water and the additional liquid carrier, along with the brominatable material and bromine. During the course of the reaction an emulsion forms, but upon completion of the reaction this emulsion separates.

The mixture of water and the auxiliary liquid carrier is important in the method of the invention since neither of these materials by themselves can be used to produce a highly brominated product of satisfactory color in good yield. If water alone is employed in the reaction, difficulties with the formation of tight emulsions arise and the product, which is a pasty mass, requires considerable additional treatment to produce even a poor yield of the brominated product. If the auxiliary carrier is employed as the sole inert carrier, a product having an unsatisfactory color results.

Auxiliary carriers which in combination with water are employed in the bromination reaction are the lower aliphatic hydrocarbons and diethyl ether. Particularly preferred are the nonpolar inert liquids such as petroleum ether and hexane. Petroleum ether is a fraction of 5- and 6-carbon aliphatic hydrocarbons having a boiling point in the range of about 40–60° C. Other nonpolar, low-boiling solvents boiling below about 65° C. which are inert under the conditions of the reaction may also be employed.

The method of the invention provides outstanding advantages when unsaturated higher fatty acids and derivatives thereof are to be halogenated. The principal source of these higher fatty acids and esters of these higher fatty acids resides in naturally-occurring materials such as animal, vegetable, and marine fats and oils. The naturally-occurring triglycerides such as cottonseed oil, soybean oil, safflower oil, sesame oil, perilla oil, and linseed oil often contain small amounts of color bodies and/or color precursors which increase the intensity of the color of the product upon halogenation. The amount and frequency of occurrence of these materials in triglyceride oils is variable and, while some cottonseed oil samples, for example, can in rare instances be brominated without the development of dark color, most samples are subject to substantial darkening when brominated. It is important that the halogenated oil not impart any color to soft drinks when the oil is used as a weighting agent. Further, when brominated fatty acid esters are utilized in flameproof adhesives, it may be necessary that the oil be light-colored. By the method of the present invention it is possible to produce brominated glyceride oils having a very light color, not in excess of 5 on the Fat Analysis Committee (FAC) scale.

The method of the invention involves contacting the ethylenically unsaturated organic material with the halogen in the presence of the water-nonpolar organic solvent mixture and controlling the temperature of the resulting exothermic reaction so that the reaction temperature does not exceed about 30° C. When the reaction is completed, the viscosity of the reaction mixture is reduced by adding a further amount of the nonpolar solvent to the mixture and then removing unreacted bromine by extraction with a bromine solvent such as methanol, ethanol or other lower alkanol. The bromine can also be removed by neutralization with an inorganic salt such as sodium hydroxide or ammonium hydroxide. Other means for removing the bromine are known to those skilled in the art.

The order of addition of reactants is variable and it is not critical whether the bromine is added dropwise to a mixture of the material to be brominated in water and the nonpolar solvent or the bromine in the nonpolar solvent is added to a water mixture of the material being brominated. In view of the exothermic nature of the reaction, it is recommended that contact of the bromine with the brominatable liquid composition be gradual and be carried out over a period of time.

The amount of water used in the carrier can be varied considerably, although there should be enough water present in the carrier to retard the development of color. Usually at least about 25% water based on the weight of the material being brominated produces a measurable color improvement. Larger amounts, around 50–75% water based on the weight of the oil are preferred. As the amount of water in the reaction exceeds about 100% based on the brominatable material, an objectionable, viscous, pasty type emulsion is produced and it is extremely difficult to isolate the brominated product from water and bromine.

The inert, nonpolar solvent carrier is employed in the reaction, both as a solvent for the brominatable material and bromine. At least about 15% of the nonpolar solvent based on the weight of the brominatable material is sufficient to insure good contact of the reactants and to provide a workably fluid reaction mixture. It is generally preferred to use around 20–25% of the nonpolar solvent based on the brominatable material. It is possible to use larger amounts of the nonpolar solvent, although no benefit is derived from the use of larger amounts and it is generally desirable to hold the volume of inert carriers to a minimum to obtain maximum efficiency of the capacity of the reaction vessel.

Brominatable ethylenically unsaturated compositions which may advantageously be treated in accordance with the method of the invention include liquid unsaturated organic compositions generally. Derivatives of unsaturated higher (10–22 carbon) fatty acids represent a preferred group of materials. Esters of long-chain unsaturated fatty acids with mono-, di-, and polyhydric alcohols, higher fatty ketones, higher fatty amides, higher fatty nitriles, and sulfonated fats containing ethylenic unsaturation are also envisioned. The process is particularly useful in the treatment of glycerides such as animal, vegetable, and marine fats and oils possessing unsaturation, in the fatty acid radical portion of such glyceride molecules. The ethylenic unsaturation is present as one or more pairs of unsaturated bonds. In an oleic acid radical, there is one unsaturated bond, while in a linoleic acid radical there are two unsaturated groups and three or more unsaturated groups are found in fatty acid radicals derived from linolenic acid or eleostearic acid. Thus, esters of monoethenoid, diethenoid, and triethenoid acids and mixtures thereof are deemed to be within the scope of the invention. Examples of naturally-occurring compositions, in addition to those mentioned previously, include apricot kernel oil and corn oil. Fatty acid esters of glycols and fatty acid esters of monohydric alcohols such as methyl, ethyl, propyl, and butyl oleate may also be brominated by this method.

The following examples illustrate specific embodiments of the invention, but the examples are to be considered in an illustrative and not in a limitative sense.

Example I

The material brominated in this example is cottonseed oil having an iodine value of 114, a free fatty acid content of 0.05, and a Lovibond color 20/2.0. A mixture of 130 grams of this oil and 29 milliliters of petroleum ether was formed and 65 milliliters of water was added. While the mixture was agitated and cooled in an ice bath, 33 milliliters of bromine was dropped into the mixture over a period of 2 hours. During the course of the reaction the reaction temperature was maintained so as not to exceed 24° C. by cooling when necessary. The bromine was added at the rate of about 1.2 grams per minute and the reaction was substantially completed in about 1½ hours, although the mixture was stirred vigorously for an additional ½ hour to insure completion of the reaction. After the reaction is complete an additional 29 milliliters of petroleum ether was added to reduce viscosity. Then a 200-milliliter methanol wash was added and the mixture agitated. Stirring was terminated and water-methanol which formed the upper layer in the two phase system was removed by top suction. The remaining brominated oil was washed 3 times with 200 milliliter portions of methanol until the methanol no longer extracted any yellow color. The washing step can also be done by countercurrent operation.

Example II 130 grams of sesame seed oil having an iodine value of 109 was placed in a reaction vessel along with 130 milliliters of water and 29 milliliters of petroleum ether. The reaction vessel was cooled in an ice bath and the contents agitated as 33 milliliters of bromine was added dropwise over a period of two hours. The reaction temperature was maintained at 24° C. or lower during the course of the reaction. At the end of the two-hour reaction period an additional 25 milliliters of petroleum ether was added to reduce the viscosity of the mixture and 200 milliliters of methanol was added and the mixture agitated. Stirring was stopped after a brief agitation period and the water-methanol upper layer in the two phase system was removed by top suction. Three more washes with methanol substantially in accordance with the procedure shown in Example I were made and the product was dried by sparging nitrogen through the oil while the oil was maintained under vacuum conditions. After all the water and residual solvent had been removed, vacuum was employed to remove the last traces of water, solvent and dissolved air. The brominated product had an iodine value of 1 and FAC color of 3+ and a specific gravity of 1.32.

Example III 130 grams of methyl oleate having an iodine value of 90 was placed in a one liter beaker along with 65 milliliters of petroleum ether and 65 milliliters of water. The vessel was cooled in an ice bath and the mixture was agitated vigorously while 25 milliliters of bromine was added dropwise. After completion of the bromination 29 milliliters of petroleum ether was added to reduce the viscosity of the mixture and excess bromine was washed out of the mixture with a 50% aqueous methanol solution. After washing, the oil was finished in the manner outlined in Example II. The product had a specific gravity of 1.15, an iodine value of 2, and an FAC color of 4.

Example IV 130 grams of cottonseed oil having an iodine value of 115 was placed in a reaction vessel with 29 milliliters of diethyl ether and 65 milliliters of water. 33 milliliters of bromine was then added dropwise over a period of two hours. The mixture was agitated vigorously during addition of the bromine and the temperature of the reaction mixture was held at a maximum of 24° C. After completion of the reaction an additional 29 milliliters of diethyl ether was added followed by 200 milliliters of methanol. The mixture was stirred and then permitted to settle. The water-methanol upper layer was removed by top suction and the brominated cottonseed oil was again washed three times with 200 milliliter portions of methanol. After sparging air through the oil while the oil was maintained under vacuum conditions and drying, the product had an iodine value of 1 and an FAC color of 34. The specific gravity was 1.346.

The brominated product was dried by sparging air through the oil while the oil was maintained under vacuum conditions. After all of the water and residual solvent had been removed the air sparge is shut off and vacuum is employed to remove the last traces of water, solvent and dissolved air. The brominated product had an iodine value of 0.36, an FAC color of 3+, and a specific gravity of 1.3457.

A similar run conducted in exactly the same manner with the exception that the water was omitted from the solvent mixture resulted in the production of an oil having an FAC color of 19, an iodine value of 0.45, and a specific gravity of 1.345.

The same procedure was also followed in a run wherein water in the amount noted above was used as the sole diluent and the petroleum ether was omitted. The brominated product was so viscous and pasty that it was not possible to obtain a satisfactory yield of brominative material without an excessive amount of methanol washing.

The drying of the oil and removal of solvent from the oil can be accomplished by evaporating these materials from the oil in the form of a thin film. A very thin film of the brominated material is formed and this film is subjected to a high vacuum while the surface on which the film is formed is held at a temperature not exceeding about 65° C. The very short contact time between the heat and oil during the removal of oil and solvent does not cause any deterioration by way of development of color in the oil.

Obviously, many modifications and variations of the invention as hereinbefore set forth may be made without departing from the spirit and scope thereof and, accordingly, only those limitations should be imposed as are indicated in the appended claims.

I claim:

1. A method for brominating liquid, ethylenically unsaturated organic material selected from the group consisting of higher fatty acids and esters of higher fatty acids and avoiding the development of color in said material comprising: reacting bromine with said organic material in the presence of about 25–100% water based on said organic material and a nonpolar solvent selected from the group consisting of petroleum, ether, diethyl ether, and hexane.

2. A method for brominating liquid, ethylenically unsaturated organic material selected from the group consisting of higher fatty acids and esters of higher fatty acids and avoiding the development of color in said material comprising: contacting said organic material with bromine in the presence of a mixture of about 25–100% water based on said organic material and a nonpolar solvent selected from the group consisting of petroleum ether, diethyl ether and hexane to initiate an exothermic reaction, controlling the temperature of said reaction mixture below about 30° C., adding an additional amount of said nonpolar solvent to said mixture and removing unreacted bromine from said mixture.

3. The method of claim 2 where the organic material is an ester of an unsaturated higher fatty acid.

4. A method for brominating vegetable oils containing ethylenic unsaturation comprising: contacting said vegetable oil with bromine in the presence of about 25–100% based on said vegetable oil of water and a nonpolar solvent selected from the group consisting of petroleum ether, diethyl ether and hexane, agitating said mixture while maintaining the temperature of said mixture below about 30° C., separating the brominated vegetable oil from unreacted bromine and said solvents and removing residual solvents from said brominated material by vacuumization.

5. The method of claim 1 wherein the nonpolar solvent is petroleum ether.

6. A method for brominating liquid naturally-occurring triglyceride and avoiding the development of color in said triglyceride comprising: reacting bromine with said triglyceride in the presence of about 25–100% water based upon the weight of the triglyceride and a nonpolar solvent selected from the group consisting of petroleum ether, diethyl ether and hexane.

7. A method for brominating liquid brominatable ethylenically unsaturated organic materials selected from the group consisting of higher fatty acids and esters of higher fatty acids and avoiding the development of color in said materials comprising: reacting bromine with said organic material in the presence of added water in an amount of about 25–100% based on said materials and at least about 15% based upon the weight of said brominatable material of a nonpolar solvent selected from the group consisting of petroleum ether, diethyl ether and hexane.

References Cited by the Examiner

UNITED STATES PATENTS 1,466,665  9/1933  McElroy _____ 260—660

FOREIGN PATENTS 468,239  9/1950  Canada.

OTHER REFERENCES

Kanyaev: Chem. Abstracts 54, 1249f (1960).

Ralston: Fatty Acids and Their Derivatives, pages 441–442 (1948 edition).

CHARLES B. PARKER, *Primary Examiner.*

DANIEL D. HORWITZ, *Examiner.*